United States Patent [19]
Hoffmann et al.

[11] 4,255,105
[45] Mar. 10, 1981

[54] EQUIPMENT FOR THE CONTINUOUS PRODUCTION OF FOAM BOARDS

[75] Inventors: Erwin Hoffmann, Leverkusen; Werner Dietrich, Cologne-Dellbrueck; Karl J. Kraft, Leverkusen, all of Fed. Rep. of Germany

[73] Assignee: Bayer Aktiengesellschaft, Bayerwerk, Fed. Rep. of Germany

[21] Appl. No.: 86,106

[22] Filed: Oct. 18, 1979

[30] Foreign Application Priority Data

Jun. 15, 1979 [DE] Fed. Rep. of Germany ....... 2924184

[51] Int. Cl.³ .............................................. B29D 27/04
[52] U.S. Cl. ................................. 425/144; 264/46.2; 264/46.3; 264/53; 264/54; 264/216; 264/DIG. 84; 425/89; 425/224; 425/817 C
[58] Field of Search ................... 425/4 C, 224, 817 C, 425/89, 144; 264/54, 46.2, DIG. 84, 216, 41, 46.3, 53

[56] References Cited

U.S. PATENT DOCUMENTS

| 2,957,207 | 10/1960 | Roop et al. ................. 264/216 X |
| 3,007,200 | 11/1961 | Paulsen et al. ............... 425/89 X |
| 3,553,300 | 1/1971 | Buff ................................. 264/41 |
| 4,108,585 | 8/1978 | Proksa et al. ............ 425/817 C X |

FOREIGN PATENT DOCUMENTS 58 12/1978 European Pat. Off. ......... 264/DIG. 84

Primary Examiner—Philip Anderson
Attorney, Agent, or Firm—Gene Harsh; Joseph C. Gil; R. Brent Olson

[57] ABSTRACT

The present invention relates to equipment for the continuous production of foam boards, and particularly rigid foam boards, which may be laminated between facings. The apparatus broadly comprises a conveyor, which at the pouring end is equipped with an inclined table and a transverse distribution device, and a foam mixture application device provided above the table.

9 Claims, 5 Drawing Figures

EQUIPMENT FOR THE CONTINUOUS PRODUCTION OF FOAM BOARDS

BACKGROUND OF THE INVENTION

Equipment for the continuous production of foam boards is known and is used for the production of continuous foam buns or sandwich boards which generally consist of a foam core and one or more facings adhered thereto. Double conveyor belts are used to produce such sandwich boards and generally require both a lower and upper conveyor. In the case of foam bun production, the foaming mixture is allowed to freely rise and may be optionally leveled from the top to avoid bulging. In the case of foam sandwich board production, the two conveyors put pressure on the foaming mixture. One problem facing the art, which has not yet been satisfactorily solved, is the continuous distribution of the reaction mixture in the advance and the transverse directions.

One commonly used method is to use an application device having a mixhead which moves transversely back and forth. This method, however, causes the foaming material to accumulate at the edges. The oscillating movement of the mixhead causes high impacts on the turning points. Because of the required high velocity, these impacts create wear and tear and cause the foamable material to splash. At high manufacturing velocities, the additional problem occurs that the distance between the zigzag lines of the applied foamable mixture becomes too great for uniform foaming.

The use of an inclined table is also well-known in the art. It has the advantage that the foaming reaction mixture flowing from the mixhead meets the application surface more gently due to the angle of inclination. The mixture partially distributes itself over the width on the table. With wider widths, several parallel mounted mixheads have been used. Difficulties are, however, often encountered at the points where the individual flows intermix during spreading. Cellular striation and bubbles will then generally form in the finished part.

Attempts have been made to level the applied mixture with a rake or a roller which forms a space or gap with the lower conveyor surface. Problems have, however, been encountered when the height of the space or gap is too high. It was found that the transverse distribution did not take place fast enough and that the reaction mixture begins to foam on the edges before it passes through the space or gap. This causes nonhomogeneous edge zones, which vary in structure as well as in density. For these reasons, the processing of foaming materials, particularly of highly reactive systems, presents considerable problems.

Therefore, in the continuous production of continuous foam buns and particularly in the production of foam boards or sandwich boards having a foam core, the problem of improving the mixture distribution over the operation width to such a degree that a satisfactory homogeneity of the finished part is obtained, must be solved. In doing this, the length of the pouring end and the total length of the equipment should be as short as possible.

DESCRIPTION OF THE INVENTION

Figure 1:
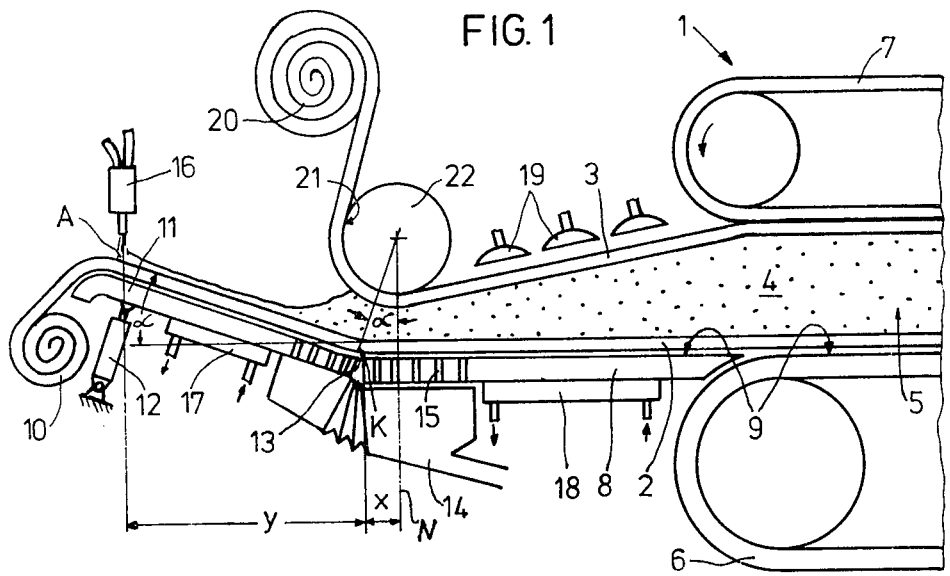
FIG. 1 is a side view of one embodiment of the apparatus of the instant invention.

The instant invention is thus directed to an apparatus for the continuous production of foam boards comprising (i) a conveyor, (ii) an inclined table at one end of said conveyor, the incline of said table sloping downwardly toward said conveyor, wherein the plane of the upper surface of said conveyor and the plane of the downwardly sloping surface of said inclined table intersect forming an angle of from 3° to 45° (iii) a foam mixture application device located above said table, and (iv) a transverse foam mixture distribution device located downstream of said application device and located above said conveyor, and having a convexly curved surface facing towards the sloping surface of said inclined table and facing towards the upper surface of said conveyor, the said distribution device being located such that the line formed by the intersection of a vertical plane through the center of curvature of said distribution device and the plane of the upper surface of said conveyor is X mm from the line of intersection of the planes of the downwardly sloping surface of said inclined table and of the upper surface of said conveyor, wherein $$X = [(r+s) \cdot \tan \alpha] \pm 20\%,$$

where
- $r$ represents the radius of curvature of said distribution device in mm,
- $s$ represents the height in mm of the space between the upper surface of the conveyor and the lower surface of the distribution device, and
- $\alpha$ represents the angle formed by the plane of the upper surface of said conveyor and the plane of the downwardly sloping surface surface of said inclined table.

In the preferred embodiment for the production of laminated or sandwiched products, $X = [(r+s+d_1+d_2+\ldots+d_n) \cdot \tan \alpha] \pm 20\%$ where r, s and $\alpha$ represent the parameters noted above and $d_1, d_2, \ldots, d_n$ represent the thicknesses in mm of each facing material used.

The line of intersection of the plane of the downwardly sloping surface of the inclined table and the plane of the upper surface of the conveyor will hereafter be referred to as the "break point". In the instance where a bottom facing is utilized, and when the bottom facing is fed to the conveyor surface from below the inclined table, then the break point will be the line formed by the intersection of the plane of the downwardly sloping surface of the inclined table and the plane of the upper surface of the bottom facing. In this case, in calculating X, the thickness of the bottom facing is not included and X will be calculated according to the equation:

$$X = [(r+s) \cdot \tan \alpha] \pm 20\%.$$

Combining these measures allows for the production of boards having uniform density and density over the width and length of the produced board. Only this species combination with the defined arrangement of the distribution device surprisingly brought the desired effect. Rigid foam boards, for example, were produced on the apparatus of the invention, which had up to 50% higher compressive strengths than the boards commonly produced. The angle α preferably should be adjusted to between 10° and 20°, and most preferably is around 15°. It is believed that by exactly defining the distance of the distribution device from the break point in connection with adjusting the incline of the table a particularly fast transverse distribution results, thereby substantially eliminating the previous disadvantges.

The distance of the outflow of the application device from the space formed by the distribution device and the top surface of the conveyor must be selected so that the reaction mixture does not start to foam before it passes the space. The optimum distance depends on several factors including the viscosity and reactivity of the particular reaction mixture chosen. For the most commonly used reaction having before reacting a viscosity between about 200 and 5000 mPa·s mixtures, the following parameters will generally yield the optimum results. At an operating width of from 1.00 to 1.40 m, an angle of the table of 10° to 30°, a production velocity of from 5 to 15 m/min, and a flow velocity of the mixture from the outflow of from 1 to 3 m/sec, the most advantageous distance between the outflow and the space if from about 1.00 to 1.50 m. If the distance is too low, bubbles and cellular striation caused by bottom splashes appear in the finished part. If the distance is too great, the mixture reacts prior to passing the space and foams too early. If should be noted that the indicated values are not intended to be restrictive. If one of the particular parameters deviates from those noted, the change can be compensated by one or more of the other parameters. Thus, this information is really a guideline. Optimum results for any particular reaction mixture and for any particular machine can be readily determined empirically.

The conveyor surface may consist of the conveyor belt itself, having an inclined table provided at one end thereof. The actual conveyor belt may also be preceded by a rigid horizontal table, directly upstream of which the inclined table is provided.

In foam bun production, a bottom facing is generally provided and is folded upward on the sides. The folded paper forms a trough for the applied reaction mixture. The bottom facing may come in from beneath the table or may be fed-in from above the table. When producing sandwich boards, the lower facing may be guided in the same manner. When using rigid lower facings or individual plates arranged in tandem, these must be fed-in from underneath the table, because they cannot be fed through the break point due to the inclined table, without changing the space width between the distribution device and the conveyor. In such a case the table is coated with Telfon or a silicone layer or it is lined with an easily replaceable sheet of such a material. The mixture then runs down to the facing transported on the conveyor. When producing foam boards or buns without permanent facings, it is advantageous to use paper or plastic films as facings to protect the equipment from the reaction mixture, which facings are removed after foaming. Theoretically it is, of course, also possible to do without such films and to coat the equipment parts, which come in contact with the reaction mixture, with Teflon or a silicone layer to prevent adhesion. This measure, however, generally has many disadvantages and does not always ensure that the foam will not adhere to the eqipment.

According to a preferred embodiment of the equipment, the break point is rounded. This allows for a gentle transfer of reaction mixture from the table to the conveyor. At the same time, a most favorable funnel-shaped taper of the space between the distribution device and the conveyor or table can be obtained.

If the equipment is intended for operating with a lower facing a transversely arranged suction device is preferably provided below the conveyor in the area of the break point. The conveyor and/or table should then be perforated to allow for operation of the suction device. The suction device has the advantage that the facing can be maintained to adhere to the lower surface, thereby assuring a defined, unchanging space height. Otherwise the danger would exist of the facing lifting up under tension and lying against the distribution device.

According to another preferred embodiment, the curvature of the surface of the transverse distribution device is uneven.

In this manner, the profile contour of the transverse distribution device can be advantageously adjusted to the shape of the break point.

Particularly advantageous is the embodiment where the space has a different height over the operating width. In this way, the mixture existing from the mixhead in a thick stream is better distributed toward the edges. This can be accomplished by a thickening of the distribution device or by thickening the surface of the conveyor belt. Preferably the height of the thickening is adjustable.

To control the foaming process and to obtain a minimum total length of the equipment, the table and/or the conveyor surface may be provided with temperature control elements. Upstream of the transverse distribution device, the reaction mixture is preferably cooled to delay the reaction. Downstream of the distribution device, the reaction mixture is preferably heated to accelerate the reaction. Cooling and heating coils (through which a medium flows), electrical resistance heaters, hot air heaters, or radiating systems are suitable for this purpose. It is presently preferred to cool the table to about 10°–18° C. and to heat the section of the conveyor downstream of the space to about 25°–80° C. These temperatures may, of course, be higher or lower depending on the particular reaction mixture used.

The invention will now be described with reference to the drawings.

Figure 2:
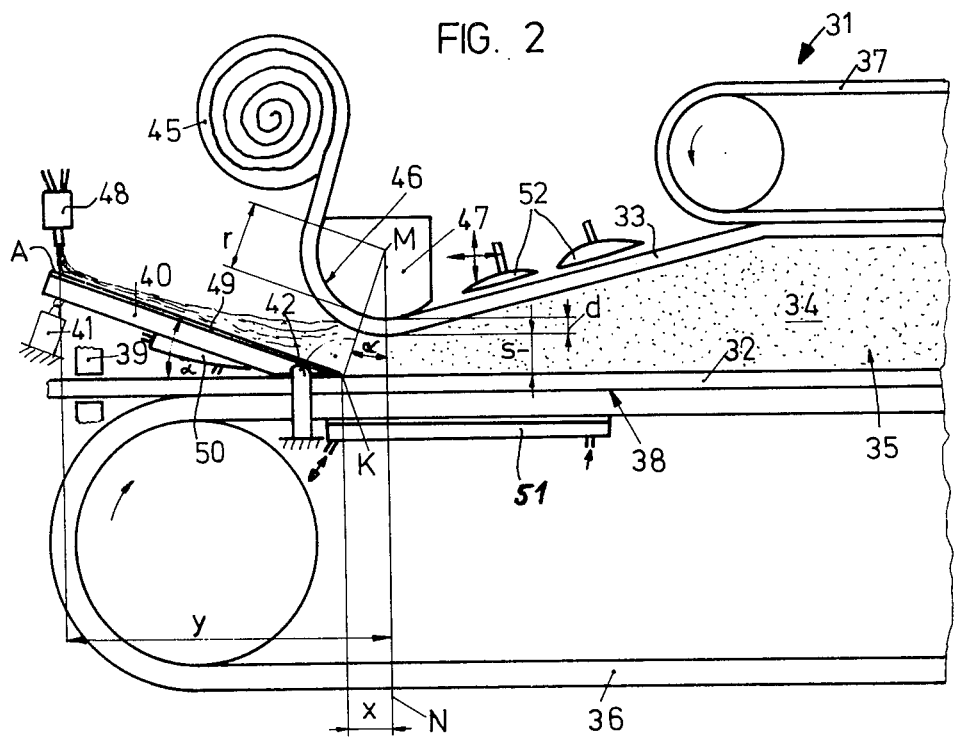
FIG. 2 is a side view of a second embodiment of the apparatus of the instant invention.

In FIG. 1, a double conveyor belt 1 for the production of a sandwich board 5 provided with facings 2, 3 and a rigid foam core 4, consists of a lower conveyor 6 and an upper conveyor 7. The upper surface of the continuously-running bottom conveyor 6 as well as a glide table 8 provided upstream of it, serve as conveyor surface 9 for the bottom facing 2. The facing 2 runs from a feed reel station 10 over the 20° (α) inclined table 11 through the break point K to the conveyor surface 9. The inclination of table 11 is adjustable via a support 12 adjustable in its length and the table therefore swivels around the axis 13. In the area of the break point K a suction device 14 is arranged below the table 11, in which area the table 11 and the glide table 8 have perforations 15. In this manner, the bottom facing 2 is guided through the break point K and adheres tightly thereto by the vacuum exerted by the suction device 14. The reaction mixure is applied by a mixhead 16 arranged above the table 11. The application point A has the distance Y=1.25 m from the vertical N.A cooling device 17 supplied with cold water is provided below the table 11. Underneath the glide table 8 is an electrical heating element 18 and above the foaming area, that is, above, the area of the glide table 8, an infrared radiation system 19 is provided. The upper facing 3 runs from a feed reel station 20 and is guided over the surface 21 of a transverse distribution device 22 designed as a roller. It extends transversely over the operation width of the bottom conveyor 6 and is adjustable in its longitudinal direction as well as in the height to adjust the space height s. In this particular embodiment, the height s is 2 mm. The roller 22 has a radius of curvature of 100 mm. The facings 2, 3 consist of bituminous paper and have a thickness of $d_1=d_2=0.5$ mm. The position of the center of curvature M of the distribution device 22 is defined so that the distance X from the break point K is 37.5 mm, according to the formula $X=(r+s+d_1+d_2)\cdot\tan 20°$ $X=(100+2+0.5+0.5)\cdot 0.36397.$ In FIG. 2, a double conveyor belt 31 for the production of a sandwich board 35 provided with facings 32, 33 and containing a foam core 34, consists of a lower conveyor 36 and an upper conveyor 37. The upper surface of the continuous bottom conveyor 36 serves as conveyor 38 for the bottom rigid facing 32. The bottom facing comes from application station 39 to the conveyor surface 38, where it is fed from below the table 40, which is inclined at an angle of 20° ($\alpha$). The table 40 forms the break point K with the conveyor surface 38 or the facing 32 transported on it. The application table 40 is adjustable with an adjustable support 41. The table is movable around the axis 42. The upper facing 33 (a paper having a thickness $d_2$ of 0.1 mm) runs from a feed reel station 45 and is guided over the surface 46 of a transverse distribution device 47 designed as a bar. This transverse distribution device 47 runs transversely over the operation width of the bottom conveyor 36, is adjustable in its longitudinal direction as well as in height to adjust the space width s (which in this case is 2.0 mm). The distribution device has a radius of curvature of 100 mm. The bottom facing 32 consists of a rigid plastic film with a thickness of $d_1=2$ mm. The position of the center of curvature M of the distribution device 47 is defined so that the distance X from the vertical N through the center of curvature M to the break point K is 37.1 mm, namely according to formula $X=(r+s+d_1+d_2)\cdot\tan 20°$. $d_1=0$, because the bottom facing 33 is guided from below the application table 40 and does not enter into the calculation, $d_2=0.1$ mm is negligible. The simplified calculation formula is in this case:

$X=(r+s)\cdot\tan 20°;$ $X=(100+2)\cdot 0.36397;$ $X=37.12494$ mm.

The mixhead is designated with 48 and the application point A has the distance Y=1.25 m from the vertical N through the center of curvature M of the transverse distribution device 47. The table 40 is covered with a sheet 49 of polytetrafluoroethylene, to prevent the mixture from sticking to it. A cooling device 50 is provided below the table 40. The conveyor surface 38 is provided with a heating device 51. Heat radiators 52 are arranged above the foaming area.

Figure 3:
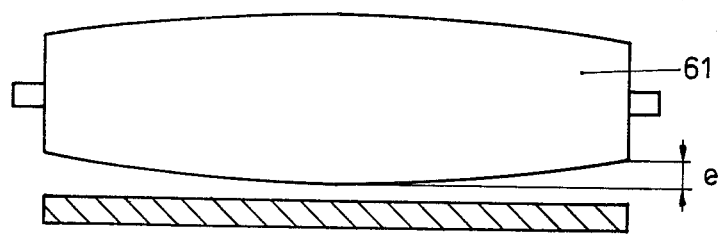
FIG. 3 is a front view of a distribution device according to the instant invention wherein the distance from the device to the lower conveyor varies transverse to the direction of foam flow.

In FIG. 3, the roller-shaped transverse distribution device 61 is crowned in the middle, the difference in the radius between the roller center and roller ends being e=0.18 mm. The crowning is designed, viewed in a cross cut, similar to a catenary. When calculating the distance X, the value e generally may be neglected. With a larger crown, however, it is generally preferable to utilize an average radium and an average height s.

Figure 4:
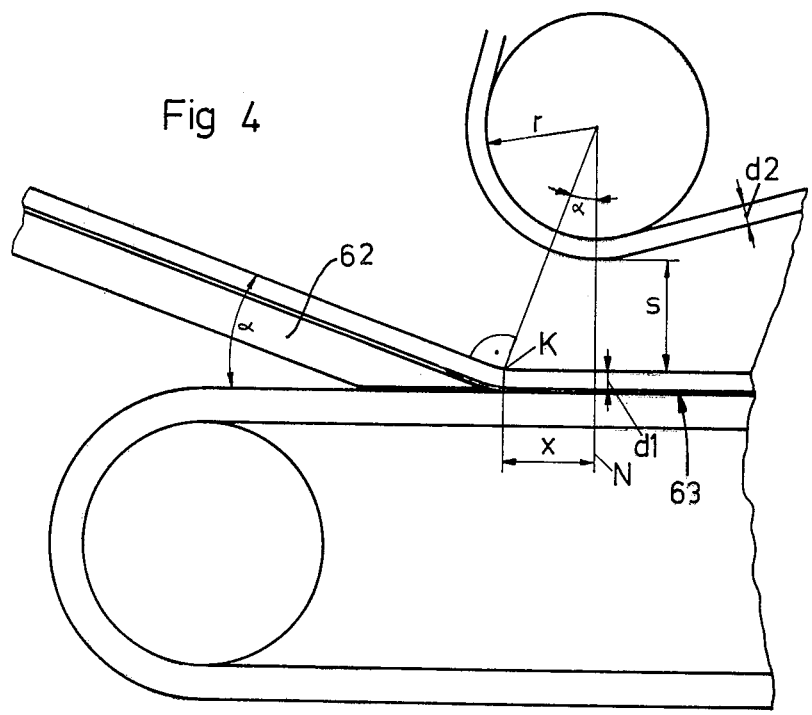
FIG. 4 is a side view of an apparatus according to the present invention wherein the break point between the inclined table and the lower conveyor surface is provided with a smooth curvature.

In FIG. 4, the break point K is softly rounded, so that a continuous transfer of the mixture from the table 62 to the conveyor 63 exits. FIG. 4 also indicates in a large view the various parameters set forth herein.

Figure 5:
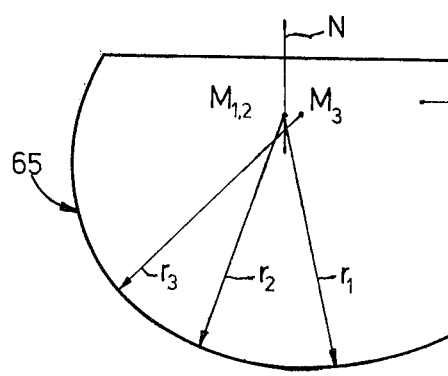
FIG. 5 is a side view of a distribution device which has varied radii and centers of curvature.

FIG. 5 shows a transverse distribution device 64, whose surface 65 is provided with different radii of curvature, $r_1$, $r_2$, or $r_3$. The transfers from one surface to another are optionally improved by an envelope cover. The centers of curvature M have for each radius of curvature r a special position as for example $M_{1,2}$ for $r_1$ and $r_2$, $M_3$ for $r_3$. The radius $r_1$ given in the vertical N serves for this calculation of the distance X. An average value of the two or more neighboring radii may also be used. Generally, however, the consideration of only one r is sufficient, since any differences should be negligible and should lie within the tolerance limit of ±20%.

The invention is further illustrated, but is not intended to be limited by the following examples in which all parts and percentages are by weight unless otherwise specified.

EXAMPLE

A double conveyor belt by Maschinenfabrik Hennecke GmbH, St. Augustin 1, Federal Republic of Germany was used. This equipment was provided with a fixed mixhead and its construction is essentially according to that shown in FIG. 2, where, however, the bottom facing was guided above the table and was held in the break point by suction effect. The advance velocity of the conveyor was 10 m/min. 14 1/min. of reaction mixture were applied. The operation width was 1.25 m. Sandwich boards with 0.1 mm thick paper facings covering a rigid foam core on both sides were to be produced. The total thickness of the boards was to be 40 mm. The application table was cooled to 15° C., and the glide table was heated to about 30° C.

The following reaction mixture was used:

40 pbw of a sucrose ether with the OH number 520,
12 pbw of an ethylenediamine-started polyether with the OH number 480,
12 pbw glycerine,
1.8 pbw water,
1.5 pbw of a silicone stabilizer (type OS 710 by Bayer AG, Leverkusen, Fed. Rep. of Germany),
1.5 pbw dimethylcyclohexylamine,
45 pwb trifluorochloromethane,
201 pbw crude 4,4-diphenylmethandiisocyanate (Desmodur$^R$ 44V20 by Bayer AG, Leverkusen).

The reaction time of this mixture was 120 seconds, 10 seconds of which were for the cream time, 20 seconds for the tack-free time, and 90 seconds for the curing time [Definitions according to "Kunststoffhandbuch" (Plastics Handbook) Volume VII, "Polyurethane" Vieweg and Hoechtlen, Carl-Hanser Publishing House, Munich, 1966].

Test 1

The mixture application point was 1.25 m ahead of the 100 mm diameter (r=somm) roller, serving as transverse distribution device. The levelling space had a height of 2.0 mm. An inclined table was not present. Totally unusable sandwich boards were produced, because the reaction mixture could be spread only to a width of 100 mm before foaming.

Test 2

Instead of a transverse distribution device, a table was provided which had an inclination of 8°. Again, an insufficient transverse distribution resulted, which led to unusable sandwich boards.

Test 3

A combination of the transverse distribution device according to test 1 with the inclined table according to test 2 was used. The mixture was completely distributed over the width; the edge formation, however, was insufficient and the deviation in thickness was too great. The following thicknesses were obtained over the width: left edge zone 38 mm, at ¼ width 40 mm, at ½ width (center) 41 mm, at ¾ width 40 mm, right border zone 36 mm. The thickness tolerance lies also at 10%. The average compressive strength of the product was 0.24 MPa (measured according to DIN 53 421). The density was 30 kg/m³.

Test 4

Test 3 was repeated but with a defined arrangement of the transverse distribution device at a distance X between break point and the vertical N through the center of curvature of the distribution device. The distance X was $$X=(r+s)\cdot\tan 8°;$$
$$X=(50+2)\cdot 0.14054=7.3 \text{ mm}$$

The thickness of the facings of 0.1 mm each could be neglected. The finished product had a thickness of 39.5 mm in the left border zone, at ¼, ½ and ¾ of the width each 40 mm and the right border zone had a thickness of 40.1 mm. The thickness tolerance lies below 2%. The compressive strength of the product was 0.29 MPa and the density 30 kg/m³.

What is claimed is:

1. An apparatus for the continuous production of foam boards comprising:
   (i) a conveyor
   (ii) an inclined table at one end of said conveyor, the incline of said table sloping downwards toward said conveyor, wherein the plane of the upper surface of said conveyor and the plane of the downwardly sloping surface of said inclined table intersect forming an angle α of from 3° to 45°.
   (iii) a foam mixture application device located
   (iii) a foam mixture application device located above said downwardly sloping surface, and
   (iv) a transverse foam mixture distribution device located downstream of said application device and above said conveyor, and having a convexly curved surface facing towards the sloping surface of said inclined table and towards the upper surface of said conveyor, the said distribution device being located such that the line formed by the intersection of a vertical plane through the center of curvature of said distribution device and the plane of the upper surface of said conveyor is X mm from the line of intersection of the planes of the downwardly sloping surface of said inclined table and of the upper surface of said conveyor, wherein $$X=[(r+s)\cdot\tan. \alpha]\pm 20\%$$

where
r represents the radius of curvature of said distribution device in mm,
s represents the height in mm of the space between the upper surface of the conveyor and the lower surface of the distribution device.

2. The apparatus of claim 1 further comprising
   (v) means for feeding one or more facings to said conveyor.

3. The apparatus of claim 2 wherein $$X=[(r+s+d_1+d_2+\ldots d_n)\cdot\tan. \alpha]\pm 20\%$$

wherein $d_1, d_2, \ldots, d_n$ represent the thickness in mm of said facings.

4. The apparatus of claim 1 wherein the area in which the plane of the upper surface of said conveyor intersects the plane of the downwardly sloping surface of said inclined table is rounded.

5. The apparatus of claim 1 with an application device for a bottom facing, characterized in that a transversely extending suction device is provided below the conveyor in the area of the intersection of the planes of the upper surface of said conveyor and the downwardly sloping surface of said inclined table.

6. The apparatus of claim 1 characterized in that the curvature of the surface of the distribution device is uneven.

7. The apparatus of claim 1, characterized in that the height of the space s differs over the operation width.

8. The apparatus of claim 1, characterized in that said table is equipped with a temperature control device.

9. The apparatus of claim 8, characterized in that the section of the conveyor downstream of the transverse distribution device is equipped with a temperature control device.

* * * * *